Patented Feb. 7, 1933

1,896,291

UNITED STATES PATENT OFFICE

JOHN W. DENNIS AND ELMER A. DENNIS, OF ERICK, OKLAHOMA

ANTIFREEZE MIXTURE FOR MOTOR VEHICLE RADIATORS

No Drawing.     Application filed April 22, 1930.  Serial No. 446,408.

This invention relates to the class of anti-freeze preparations, particularly an anti-freeze preparation for use in the radiators of motor vehicles.

The primary object of the present invention is to provide a preparation which may be used in the radiators of motor vehicles, which may be used in extremely cold temperatures in place of the usual cooling medium and one which may be inexpensively produced and which will give complete satisfaction.

The present anti-freeze preparation comprises a mixture of filtered crank-case oil or drainings, kerosene and oil of peppermint.

The ingredients enumerated are preferably taken in the proportions of 50% crank-case oil or drainings, 49% kerosene and 1% essence of peppermint.

While the foregoing is the preferred form of our anti-freeze mixture taken in the proportions given we, of course, wish it to be understood that other heavy oils may be used with a degree of satisfaction in place of the filtered crank-case oil. However, we have found through experimentation that the oils named taken in the proportions given give the most satisfactory results.

In addition to the anti-freeze qualities of the mixture the inclusion of the crank-case oil or another heavy oil prevents rusting of the metal parts of the machine by and with which the kerosene comes into contact.

Having thus described our invention, what we claim is:

1. An anti-freeze mixture for motor vehicle radiators, comprising filtered engine crank-case drainings, and kerosene oil taken in approximately equal proportions.

2. An anti-freeze mixture for motor vehicle engine radiators, comprising the following ingredients taken in the following approximate proportions, filtered crank-case drainings 50%, kerosene 49%, and a perfuming substance 1%.

In testimony whereof we hereunto affix our signatures.

JOHN W. DENNIS.
ELMER A. DENNIS.